United States Patent [19]

Kurkov

[11] Patent Number: 4,505,840
[45] Date of Patent: Mar. 19, 1985

[54] HETEROCYCLIC ELECTROACTIVE POLYMERS

[75] Inventor: Victor P. Kurkov, San Rafael, Calif.

[73] Assignee: Chevron Research Company, San Francisco, Calif.

[21] Appl. No.: 442,392

[22] Filed: Nov. 17, 1982

Related U.S. Application Data

[63] Continuation-in-part of Ser. No. 397,731, Jul. 13, 1982, abandoned.

[51] Int. Cl.³ .............................................. H01B 1/00
[52] U.S. Cl. .................................. 252/500; 252/512; 252/518; 528/183; 528/341; 528/363
[58] Field of Search ...................... 528/183, 341, 363; 252/500, 510, 518, 512

[56] References Cited

U.S. PATENT DOCUMENTS

| | | | |
|---|---|---|---|
| 3,966,987 | 6/1976 | Suzuki et al. ...................... | 252/500 |
| 4,344,869 | 8/1982 | Blinne et al. ....................... | 252/500 |
| 4,344,870 | 8/1982 | Blinne et al. ....................... | 252/500 |
| 4,360,644 | 11/1982 | Naarman et al. .................. | 252/500 |
| 4,375,427 | 3/1983 | Miller et al. ....................... | 252/500 |

*Primary Examiner*—Lester L. Lee
*Attorney, Agent, or Firm*—S. R. LaPaglia; E. J. Keeling; A. Stephen Zavell

[57] ABSTRACT

Tractable doped electroactive polymers, comprising recurring units of a fused nitrogen-containing unsaturated 5,6 membered heterocyclic ring system, are fabricated from the virgin polymer by contacting the polymer with donor or acceptor conductivity modifier atoms or groups of atoms.

25 Claims, No Drawings

HETEROCYCLIC ELECTROACTIVE POLYMERS

CROSS-REFERENCE TO RELATED APPLICATIONS

This application is a continuation-in-part application of my U.S. application Ser. No. 397,731 filed July 13, 1982, now abandoned, and completely incorporated herein by reference.

BACKGROUND OF THE INVENTION

This invention relates to electroactive organic polymeric materials. More specifically, this invention relates to associating electroactivating agents known in the art as dopants with an organic polymer.

Recently, research has been conducted into organic polymeric materials in order to modify their room temperature electrical conductivity by reacting them with electron donor or acceptor molecules. The electron donor or acceptor molecules, generally known in the art as n- and p-type dopants respectively, can transform the organic polymeric materials so that these modified organic polymeric materials exhibit semiconducting and metallic room temperature electrical conductivity. Polyacetylene is an example of an organic polymeric material whose room temperature electrical conductivity can be modified over several orders of magnitude above its insulator state, by the incorporation of dopant molecules, A. J. Heeger et al, U.S. Pat. No. 4,222,903, said patent incorporated herein by reference. Other examples of organic polymeric materials whose room temperature electrical conductivity can be enhanced by several orders of magnitude over their insulator state by means of incorporation of dopant molecules are poly-p-phenylene, polypyrrole, poly-1,6 heptadiyne, and poly-phenylene vinylene. However, all of the above recited examples are of organic polymeric materials which are completely insoluble or infusable and hence are completely intractable.

Other examples of organic polymers whose room temperature electrical conductivity can be modified with the aid of dopants are polyphenylene sulfide and poly-m-phenylene. However, the above recited materials though being tractable in their original virgin state, undergo irreversible chemistry when reacted with dopants which modify their room temperature electrical conductivity. This irreversible chemistry imparts upon these dopant modified organic polymeric materials a state of intractability. Upon removal of the doping agents, these materials do not revert to the chemical structure which they originally exhibited prior to being modified by the dopants. The inorganic material polysulfur nitride is also considered a polymeric conductor. As with the previously recited polymeric materials, polysulfur nitride is also completely intractable.

For use in a wide variety of electronic device applications, it is highly desirable to have available organic polymeric electrically conducting materials having a preselected room temperature conductivity which can be varied over a broad range. This range should preferably extend from the insulator state of the unmodified organic polymeric material through the semiconducting regime and extending into the highly conducting metallic state. It is also desirable that these organic polymeric electrically conducting materials should be tractable and hence processable so that useful articles of any desired shape and size can be fabricated. Tractable organic polymers are those which can be readily shaped, formed, molded, pressed, cast, etc., into desired articles from the liquid state, i.e. either from the melt, fluid glassy state, or from solution after the completion of the polymerization reaction of the organic polymeric material.

SUMMARY OF THE INVENTION

I have invented an electroactive polymeric material comprising a dopant modified organic polymer whose room temperature electrical conductivity is controlled in a highly selective and reversible manner. Electroactive polymer is defined as a polymer having a conductivity which has been modified with electron acceptor or donor dopants to be greater than the conductivity of the virgin state of the polymer. The electroactive organic polymeric material is fabricated from a virgin polymer, which in itself is completely tractable and processable and which exhibits excellent mechanical and thermal properties as well as being highly stable to oxidative degradation, by modifying the polymer with electron donor dopants or electron acceptor dopants. The electroactive organic polymeric material is comprised of recurring units of a fused 5,6-membered nitrogen-containing unsaturated heterocyclic ring system and a conductivity modifier. More specifically, the electroactive polymer is a charged, either positive or negative, polymer backbone incorporating charge-compensating ionic dopants, i.e., ions of opposite charge to the charge of the polymer backbone. A sufficient concentration of ionic dopant is defined to be that concentration which when associated with the polymer effects a significant increase in the conductivity, i.e. on the order of 10% or greater. The recurring units are diradicals. The diradicals are directly linked to one another, or may be connected to one another via connecting units. A "connecting unit" is defined as any atom or group of atoms which can link the hereinabove diradicals together into a polymer chain without adversely affecting the reversibility of the oxidation or reduction or both. The connecting unit must be conjugated or maintain the pi orbital overlap with the heterocyclic ring system.

An n-type electroactive organic polymer is obtained by reacting the virgin polymer with reducing or electron donor dopants. Electron donor dopants induce n-type conductivity in the polymer by donating an electron to the polymer and reducing same to a polyanion and the dopant is oxidized to a cation. Similarly, a p-type electroactive organic polymer is obtained by reacting the virgin polymer with oxidizing electron acceptor dopants. Electron acceptor dopants induce p-type conductivity in the polymer by oxidizing the polymer to a polycation and the dopant is reduced to an anion. The desired value of the room temperature electrical conductivity of the dopant modified electroactive organic polymer is preselected by controlling the level of incorporation of the dopants into the virgin polymer. Alternatively, the desired value of the room temperature electrical conductivity of the dopant modified electroactive organic polymer is preselected by controlling the length of the reaction time between the virgin polymer and dopants. Furthermore, the highly selective and reversible modification of the room temperature electrical conductivity of the virgin polymer can proceed by either chemical or electrochemical means. The highly selective and reversible modification of the electrical conductivity of the dopant containing organic polymeric material together with the tractability and processability of the virgin polymer is highly desirable in that the fabrication of useful articles and devices such as primary and secondary batteries, photovoltaic devices, Schottky type devices can be accomplished. Furthermore, the materials described in this invention can be utilized as active components in such devices and articles as electrochromic displays and photolithographic processes.

DETAILED DESCRIPTION OF THE INVENTION

Electroactive organic polymers are fabricated from the modification of tractable and processable virgin polymers consisting of recurring diradical units of fused 5,6-membered nitrogen-containing aromatic, heterocyclic ring system by suitable dopants. The polymers are composed of repeating diradical units derived from fused five-, six-membered nitrogen-containing ring systems wherein the heteroatoms are in the five-membered ring. The five-membered ring contains at least one nitrogen atom and a second heteroatom selected from the group consisting of O, S, Se, Te or substituted N. For n-type polymers, acidic proton substituents on the nitrogen atoms cannot be present. A diradical is defined as a molecule that has two unsatisfied positions available for linking into the polymer chain. Optionally, the diradicals are separated in the polymer chain by connecting units. A further option is to incorporate heteroatoms such as nitrogen and the like into the six-membered ring.

Suitable examples of nitrogen-containing fused 5,6-membered heterocyclic recurring units are: N-dialkyl substituted benzimidazoles; benzoxazoles; benzothiazoles; benzoselenazole; their substituted derivatives; and mixtures thereof. Suitable examples of 5,6-membered heterocyclic recurring units wherein the 6-membered ring contains one or more nitrogens are diradicals of the following: oxazolo[5,4-d]pyrimidine; oxazolo[5,4-b]pyridine; thiazolo[4,5-d]pyrimidine; thiazolo[4,5-d]pyridazine; thiazolo[5,4-d]pyrimidine; thiazolo[4,5-b]pyridine; thiazolo[5,4-b]pyrimidine; thiazolo[4,5-c]pyridine; oxazolo[5,4-c]pyridazine; oxazolo[4,5-b]pyridine; oxazolo[4,5-c]pyridine; thiazolo[5,4-c]pyridine; oxazolo[4,5-d]pyridazine; thiazolo[5,4-c]pyridazine; oxazolo[5,4-c]pyridine, thiazolo[4,5-b]pyrazine, their substituted derivatives, and mixtures thereof. All the above fused 5,6-membered ring systems are disclosed in the Ring Index, Second Edition and Supplements I, II and III, Patterson et al, American Chemical Society, said books incorporated herein by reference. The recurring units can be substituted on the carbons of the 6-membered ring with one or more substituents to adjust either the electrical or morphological properties of the polymers fabricated therefrom. Suitable examples of substituents are the halogens, lower alkyl groups, lower alkoxy, aryl, and the like. The recurring units can be interspersed with one or more connecting units such as O, S, aryl, substituted aryl, alkenyl, thioalkenyl, thioaryl, and the like. Preferred connecting units are phenyl, —CH=CH—, and biphenylene. The connecting units can be the same or different between adjacent recurring units in the polymer chain.

Fused 5,6 heterocyclic polymers can be synthesized by condensation polymerization of suitable monomers. Other methods, known in the art, such as nucleophilic displacement of a dihalo-compound with a disodium salt of a dimercapto compound can also be used.

The electroactive polymers can be fabricated with recurring units of positional diradicals of the substituted or unsubstituted fused 5-,6-membered heterocyclic units and mixtures thereof. The diradicals can be linked through carbon atoms at the 2,4; 2,5; 2,6; 2,7; 4,6; 4,7; 5,6; and 5,7 positions, but connections at the 2,5 and 2,6 positions in the polymer are preferred. The ring system is numbered as follows:

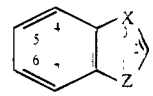

wherein X is N and Z is selected from O, S, Se, Te, or N—$R_1$. $R_1$ is lower alkyl $C_1$–$C_6$, aryl, and cyclo alkyl, alkoxy. Preferably $R_1$ is phenyl, methoxy or methyl. The $R_1$ excludes H for n-type polymers. For example, a preferred recurring unit is a 2,5 diradical illustrated as follows:

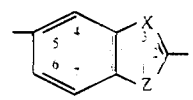

For example, a preferred 2,6 recurring diradical is illustrated as follows:

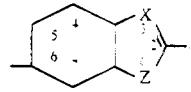

The substituted diradicals are preferably substituted in the 4 and 7 positions.

For electroactive polymers wherein the six-membered ring contains heteroatoms such as nitrogen, the diradical recurring unit can be represented by the formula:

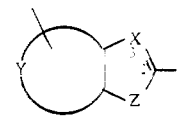

wherein Y is a fused six-membered ring containing one or two nitrogens selected from the group consisting of pyridine, pyrimidine, and pyridazine. The diradicals are linked through the 2 position carbon atom of the five-membered ring and one of the carbon atoms in the six-membered ring.

The polymer can be a homopolymer of the diradicals and the substituted derivatives thereof or a copolymer of the diradicals. A homopolymer is defined as a polymer comprising the same recurring diradical. A copolymer is defined as a polymer comprising different diradicals. In addition, the polymer is a copolymer if the same or different recurring diradicals are interspersed with connecting units. Furthermore, the recurring units can be connected, for example, with the 2,5 diradical units, head to head, i.e., 2 position to 2 position then tail to tail, i.e., 5 position to 5 position, or head to tail, i.e., 2 position to 5 position. Of course, the recurring units can be interspersed with connecting units between head to tail or head to head, or tail to tail connections.

Alternatively, with 5,6-membered rings wherein the six-membered ring contains heteroatoms, "head-to-head" means five-membered ring connected to a five-membered ring, "tail-to-tail" means six-membered ring connected to a six-member ring, or "head-to-tail" means a five-membered ring connected to a six-membered ring.

The polymer is rendered electroactive by incorporating into the virgin polymer an electron donor or an electron acceptor dopant. More specifically, the polymer is rendered electroactive by adding electrons to (reducing) or removing electrons from (oxidizing) the virgin polymer backbone. An electron donor dopant donates an electron to the polymer, the polymer becoming reduced to a polyanion and the dopant becoming oxidized to a cation. An electron acceptor dopant removes an electron from the polymer, the polymer becoming oxidized to a polycation and the dopant becoming reduced to an anion. Alternatively, the polymer can be reduced electroactive by electrochemical oxidation or reduction. In this case an electron is removed from or added to the polymer from an electrode, and charge-compensating anions or cations, respectively, are incorporated into the polymer from the supporting electrolyte solution.

In both cases the resulting electroactive polymer consists of a charged polymer backbone incorporating charge-compensating ionic dopants. A suitable positively charged compensating dopant can be a cation such as the alkali metal ions, alkali earth metal ions, Group III metal ions, and organic cations such as

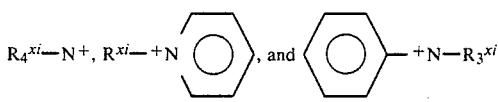

where $R^{xi}$ is a straight- or branched-chain alkyl of $C_1$-$C_6$ groups. Mixtures of these charge-compensating dopants can be employed. These ionic dopants produce n-type conductivity when associated with a reduced or negatively charged polymer polyanion.

A suitable negatively charged compensating dopant, i.e. anionic dopants, can be an anion such as the halogen ions, other ions such as $AsF_4^-$, and preferably ions such as $AsF_6^-$, $ClO_4^-$, $PF_6^-$, $SO_3CF_3^-$, $BF_4^-$, $NO_3^-$, $POF_4^-$, $CN^-$, $SiF_5^-$, $SbCl_6^-$, $SbF_6^-$, $HSO_4^-$, organic anions ions such as $CH_3CO_2^-$, (acetate), $C_6H_5CO_2^-$ (benzoate), $CH_3C_6H_4SO_3^-$ (tosylate), and the like. Mixtures of the charge-compensating dopants can be employed. These ionic dopants produce a p-type conductivity when associated with an oxidized or positively charged polymer polycation.

The oxidized or reduced polymer has a charge opposite to the ionic dopant. The charges on the oxidized or reduced polymer and the ionic dopant balance so that the electroactive polymer is an electrically neutral system. The association of the virgin polymer with electron donor dopants produces an electroactive polymer which exhibits n-type conductivity. More specifically, reduction of the virgin polymer and the incorporation of cationic charge-compensating dopants produces a polymer which exhibits n-type conductivity. The association of the virgin polymer with electron acceptor dopants produces an electroactive polymer with p-type conductivity. More specifically, oxidation of the polymer and incorporation of anionic charge-compensating dopants produces a polymer with p-type conductivity.

The electroactive polymers of the invention have the following formula:

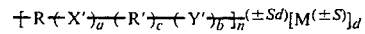

where a is either 0 or 1; b is either 0 or 1; c is either 0 or 1; n is an integer between 1 and 1,000; d is an integer between 1 and 2,000; s is an integer 1, 2, or 3; R is either an unsubstituted or substituted fused nitrogen-containing 5-, 6-membered heterocyclic diradical ring system; R' is identical to or different from R; X' is a connecting unit comprising of a single atom, or a group of atoms; Y' is a connecting unit which is identical to or different from X'; and M is an atom or a group of atoms acting as a charge-compensating ionic dopant whose electrical charge is opposite to the charge exhibited by the recurring repeat units of the polymer backbone:

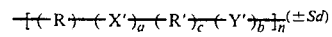

The repeat units form the polyanion or polycation of the electroactive polymer.

The diradical R group is a substituted or unsubstituted fused five-, six-membered nitrogen-containing ring. The diradicals contain a nitrogen and a second heteroatom selected from the group consisting of N—$R_1$, O, S, Se, or Te in the 1 and 2 and 3 positions in the five-membered ring. Preferred fused ring systems wherein O and N or N—$CH_3$ and N in the 1 and 3 positions, respectively.

More specifically, R and R' are unsubstituted or substituted diradicals previously recited or mixtures of diradicals which are linked to one another either directly or via the connecting units X' and Y' by forming bridges. Preferably the bridges are formed at the 2,5 or 2,6 positions 3,6.

The connecting units X' and Y' can be selected from the group comprising:

—O—; —S—; —N($R_1$)—; —CH=CH—; —C≡C—;

—CH=CH—CH=CH—; —CH=CH—S—CH=CH—;

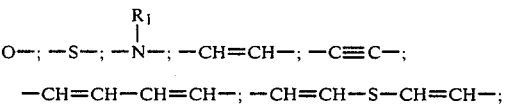

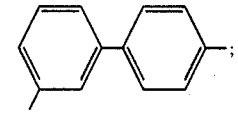

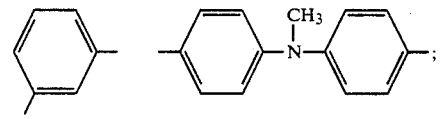

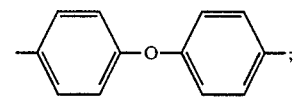

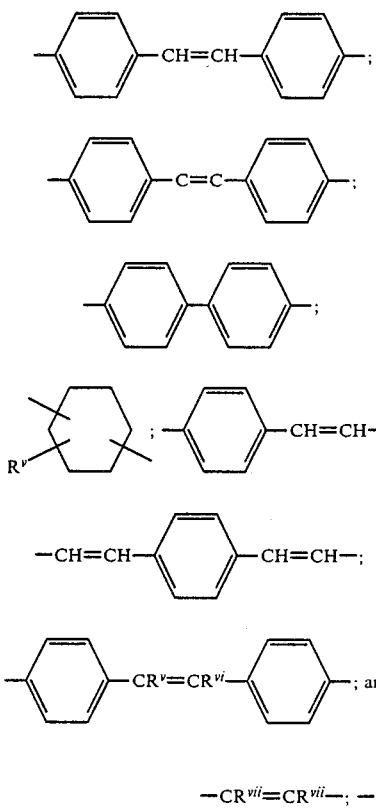

wherein $R_1$ is defined previously, and $R^v$, $R^{vi}$ and $R^{vii}$ are H or methyl, methoxy, halogen and mixtures thereof; $R_2$ is lower alkyl $C_1$–$C_4$ and P-substituted phenyl; and Ar is phenylene or biphenylene. Biphenyl, vinyl, phenyl, and

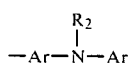

connecting groups are preferred connecting units.

The size of n determines the physical properties of the electroactive polymer. Preferably, n is from 5 to 1000 when c is zero. Most preferably, n is adjusted so that the polymer has a molecular weight of 10,000 or greater. Tractable films are formed with electroactive polymer whose n exceeds 50. Molecular weights of the polymer should be between 500 and 500,000. A preferred molecular weight is 10,000 or above.

The enhancement in conductivity of the electroactive polymer above the conductivity of polymer in the virgin state is determined by d. The value for d is not greater than 2 n. The conductivity is increased and adjusted by increasing d. Conductivities in the semiconductor region can generally be achieved with d values of about 5 percent the n value, e.g., d equals 5 when n equals 100.

More specifically, the virgin polymer, polybenzothiazole, has a conductivity of about $10^{-15}$ ohm$^{-1}$ cm$^{-1}$. The treatment of the polymer with a 0.5M solution of sodium anthracenide results in measured conductivity of about $4 \times 10^{-2}$ ohm$^{-1}$ cm$^{-1}$. Preferred electroactive polymers are doped polymers that have conductivities greater than about $1 \times 10^{-10}$ ohm$^{-1}$ cm$^{-1}$, most preferably greater than $1 \times 10^{-4}$ ohm$^{-1}$ cm$^{-1}$. Greater concentrations of the charge-compensating ionic dopant M increase the conductivity to the metallic conductivity regime. The charge-compensating cationic or anionic dopant M is selected from the previously recited dopants and the like. M remains the same for all the following preferred polymers.

The R and R' groups are the same or different. When a is 1, b and c are zero, R' and Y' drop out and the polymer has the following formula:

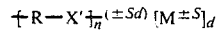

A suitable example is poly 2,5-(p-phenylene)benzothiazole plus a charge compensating ionic dopant.

When a and c are 1 and b is zero, Y' drops out and the polymer has the formula:

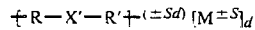

A preferred polymer of this formula is poly-p-phenylene bibenzoxazole plus a conductivity modifier.

When a is zero and b and c are 1, X' drops out and the polymer has the formula:

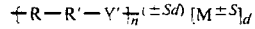

A preferred polymer of this formula is poly 2,2'-(p-phenylene)-6,6'-bibenzoxazole doped with an ionic dopant. Another preferred polymer is poly 2,2'-(m-phenylene)-6,6'-bibenzoxazole. The sulfur analogues poly 2,2'-(p-phenylene)-6,6'-bibenzothiazole and poly 2,2'-(m-phenylene)-6,6'-bibenzothiazole plus charge compensating ionic dopants are also preferred.

When a, b, and c are zero, R', X', Y' drop out and the polymer has the formula:

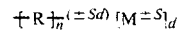

Preferred polymers of this formula are poly 2,5-benzoxazole, poly 2,6-benzothiazole and poly 2,5-(1-methyl)benzimidazole, poly 2,6-(pyridino[3,2-d]oxazole), and poly 2,6-(pyrazino[2,3]d oxazole).

A preferred 2,5 or 2,6 R or R' is selected from the group consisting of the diradicals of the formula:

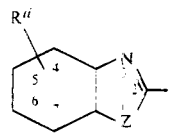

wherein $R^{ii}$ is from one to three substituent groups independently selected from H; disubstituted amino; alkyl of 1 to 4 carbon atoms; alkoxy of 1 to 4 carbon atoms; an alkylthio of 1 to 4 carbon atoms; a cycloaliphatic group of 5 or 6 carbon atoms; an aryl group of 6 to 10 carbon atoms; an aryl group of 6 to 10 carbon atoms substituted by 1 to 3 alkyl groups of 1 to 4 carbon atoms, alkoxy groups of 1 to 4 carbon atoms, 1 to 3 cyano groups, 1 to 3 halogen atoms, dialkyl amino groups of 1 to 4 carbon atoms, an alkylthiol of 1 to 4 carbon atoms; or a 5- or 6-membered nitrogen-containing unsaturated heterocyclic group. The nitrogen atoms in the above polymers can be quaternized by reaction with alkylating agents, e.g. dimethyl sulfate. The dotted lines indicate the preferred 2,5 or 2,6 positions.

The term "alkyl" refers to both straight- and branched-chain alkyl groups. Suitable examples are methyl, ethyl, propyl, isopropyl, butyl, i-butyl, s-butyl, and t-butyl.

The term "alkoxy" refers to the group $R^1O-$ wherein $R^1$ is alkyl. Suitable examples are methoxy, ethoxy, propoxy, isopropoxy, butoxy, i-butoxy, s-butoxy, and t-butoxy.

The term "alkylthio" refers to such examples as methylthio, ethylthio, propylthio, isopropylthio, butylthio, i-butylthio, t-butylthio, and s-butylthio.

Suitable examples of cycloaliphatic are cyclopentyl, cyclohexyl, 3-methylcyclopentyl, and the like.

The term "aryl" refers to an aromatic hydrocarbon radical such as phenyl, naphthyl, and the like. Suitable examples of an aryl substituted with an alkyl are 2-tolyl, mesityl, 3-isopropylphenyl and the like. Suitable aryl groups substituted with an alkoxy are 1-methoxy-2-naphthyl, 3-n-butoxyphenyl, and the like. Suitable aryl groups substituted with a cyano group are 4-cyanophenyl, 4-cyano-1-naphthyl, and the like. Suitable examples of an aryl with a halogen are 4-fluorophenyl, 3-chloro-4-bromo-1-naphthyl, and the like. Suitable examples of an aryl substituted with a dialkyl amino are 3-dimethylaminophenyl, 6-diethylamino-2-naphthyl, and the like. Suitable examples of an aryl substituted by an alkylthio are 4-butylthiophenyl, 3-methylthio-2-naphthyl, and the like. Suitable examples of 5- or 6-membered nitrogen-containing heterocyclic groups are 3-pyrrolyl, 4-pyridyl, and the like.

Suitable substituted diradicals are exemplified by the following polymers: poly 2,6-(4-methoxy-benzoxazole), poly 2,6-(5-ethylbenzoxazole); poly 2,5-(6-methylthiobenzoxazole); poly 2,6-(4-phenyl-benzoxazole; and the like. Of course, the other diradicals, such as the sulfur, nitrogen and selenium analogues, of the invention can be substituted. Furthermore, the substituted diradicals can be interspersed with connecting units.

A preferred R or R' is selected from the group consisting of the diradicals of the formula:

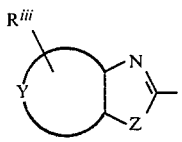

wherein $R^{iii}$ is one or two substituents on the ring carbon atoms as defined for $R^{ii}$, and Y and Z are as defined previously. The following are preferred electroactive polymers when R and R' are the same, b and c equal 1, a equals 0, Z is $N-R_1$ wherein $R_1$ is methyl, $R^{ii}$ is H, Y is carbon, X is nitrogen, and Y' is m-phenyl or p-phenyl.

Poly 2,2'-(p-phenylene)-1,1'-dimethyl-5,5'-bibenzimidazole:

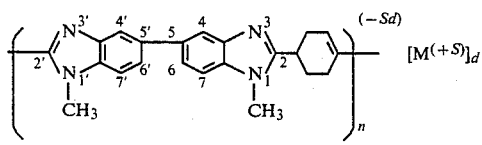

The polymer exhibits reversible N-type conductivity.

Poly 2,2'-(p-phenylene)-1,1'-dimethyl-6,6'-bibenzimidazole:

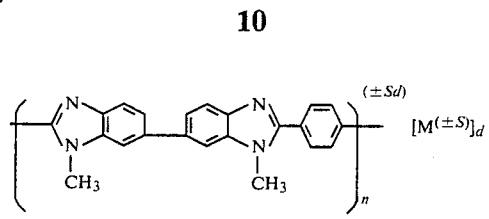

The polymer exhibits reversible N-type and P-type conductivity.

Poly 2,2'-(m-phenylene)-1,1'-dimethyl-5,5'-bibenzimidazole:

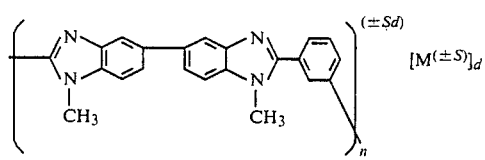

Poly 2,2'-(m-phenylene)-1,1'-dimethyl-6,6'-bibenzimidazole:

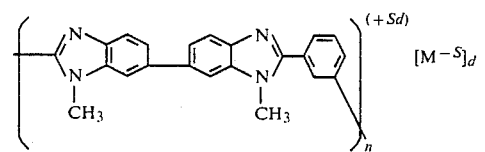

The polymer exhibits reversible P-type conductivity.

Poly 2,2'-(p-phenylene)-6,6'-(N,N'-dimethyl bibenzoxazolium) metasulfate.

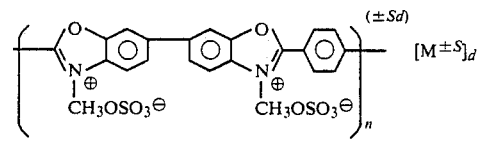

Other suitable polybenzimidazole polymers are N-alkylated polybenzimidazoles disclosed in U.S. Pat. Nos. 3,509,108; 3,549,603; and 4,020,142; said patents completely incorporated herein by reference. The nitrogens can be alkylated by methods known in the art. The polymers are rendered conductive by exposing the polymers to oxidizing or reducing dopants or by electrochemical doping means.

Suitable preferred oxygen-containing recurring units, i.e., benzoxazole, are obtained when R and R' are benzoxazole, b and c are 1, a is 0, Z is O, $R^{ii}$ is H, Y is carbon, X is nitrogen, Y' is m-, p-phenylene, or as indicated. More specifically, the recurring units are as follows:

Poly 2,2'-(p-phenylene)-5,5'-bibenzoxazole:

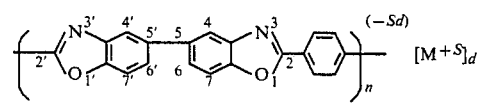

The polymer exhibits reversible N-type conductivity.

Poly 2,2'-(p-phenylene)-6,6'-bibenzoxazole;

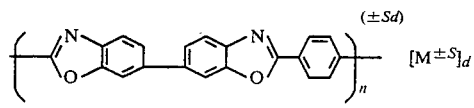

The polymer exhibits reversible N-type and P-type conductivity.
Poly 2,2'-(m-phenylene)-5,5'-bibenzoxazole:

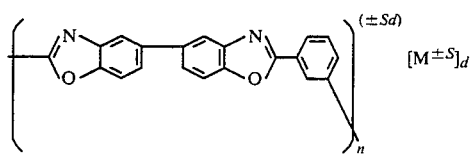

Poly 2,2'-(m-phenylene)-6,6'-bibenzoxazole:

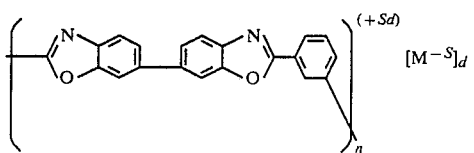

The polymer exhibits reversible P-type conductivity.
Poly 2,2'-(N-methyl-p,p'-aminodiphenylene)-6,6'-bibenzoxazole:

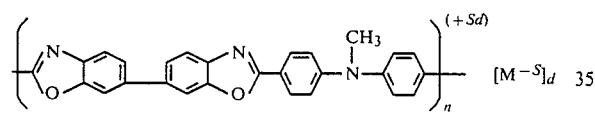

The polymer exhibits reversible P-type conductivity.
Poly 2,2'-(4,4'oxydiphenylene)-6,6'-bibenzoxazole:

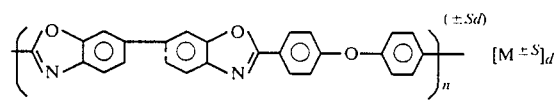

Poly 2,2'-(4,4'-thiodiphenylene)-6,6'-bibenzoxazole:

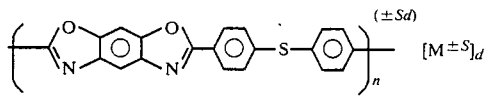

Poly 2,2'-(4,4'-diphenylene)-6,6'-bibenzoxazole:

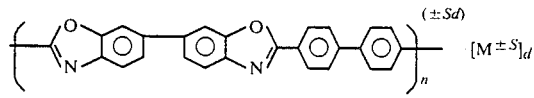

Poly 2,2'-(o-phenylene)-6,6'-bibenzoxazole:

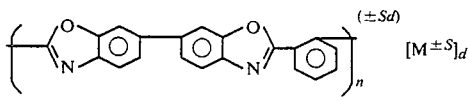

Poly 2,2'-(3,5-furanediyl)-6,6'-bibenzoxazole:

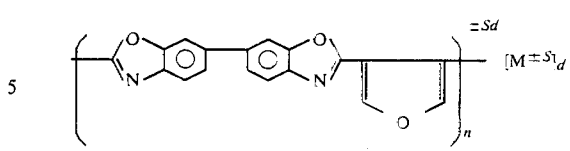

Poly 2,2'-(vinylene)-6,6'-bibenzoxazole:

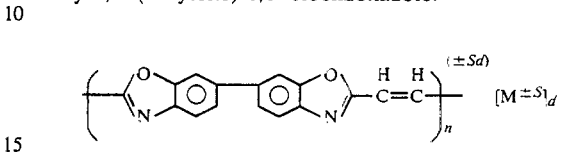

Poly 2,2'-(ethynylene)-6,6'-bibenzoxazole:

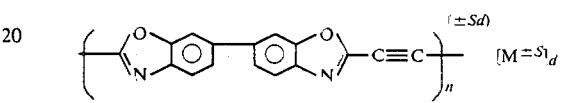

Poly 2,2'-(2,6-pyridinediyl)-6,6'-bibenzoxazole:

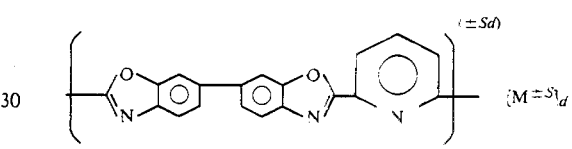

Poly 2,2'-(2,5-pyridinediyl)-6,6'-bibenzoxazole:

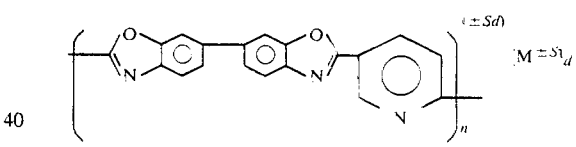

Poly 2,2'-(2,5-oxadiazolediyl)-6,6'-bibenzoxazole:

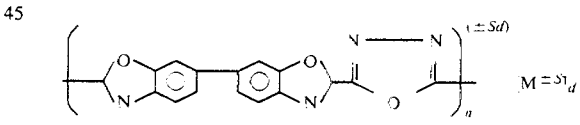

Poly 2,2'-(2,5-pyrazinediyl)-6,6'-bibenzoxazole:

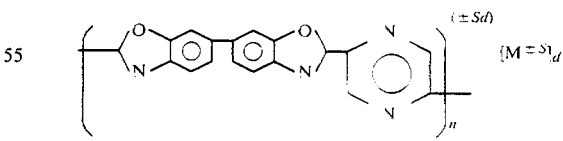

The sulfur and N—R$_1$ analogues of the above polymers are also preferred.

Other preferred polymers are poly 2,2'-(p-diphenylene)-6,6'-bibenzoxazole and poly 2,2'-(p-diphenylene)-5,5'-bibenzoxazole plus charge compensating ionic dopants.

A particular preferred recurring unit has the formula:

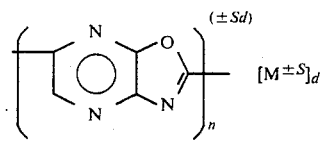

The following is a preferred electroactive polymer when a and b are 0, c is 1, and R and R' are benzoxazole attached tail-to-tail:
Poly 2,2'-(6,6'-bibenzoxazole):

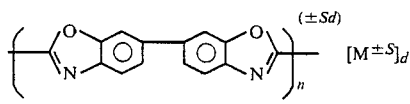

The following are preferred electroactive polymers when a, b, and c are 1, R and R' are benzoxazole or benzothiazole, X' is O or S, and Y' is m or p phenylene:
Poly 2,2'-(p-phenylene)-6,6'-oxybibenzoxazole:

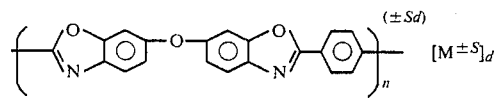

Poly 2,2'-(p-phenylene)-6,6'-oxybibenzothiazole:

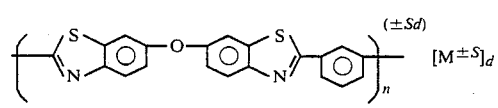

Poly 2,2'-(m-phenylene) 6,6'-thiobibenzothiazole:

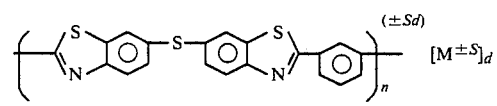

POLYMER FABRICATION

The starting material for preparing the electroactive polymers of this invention are polymers and copolymers comprising recurring units of fused nitrogen-containing unsaturated heterocyclic ring system. Preferably the recurring units are substituted or unsubstituted fused 5-, 6-membered heterocycles wherein a nitrogen and another heteroatom are in the 5-membered ring. These polymers and copolymers are well known materials having been synthesized in a variety of ways.

For example, the benzimidazoles are disclosed in U.S. Pat. Nos. Re. 26,065; 3,509,108; 3,549,603; and 3,551,389, all of said patents incorporated completely herein by reference. The nitrogens can be substituted, e.g., N-alkylated, by methods known in the art.

High molecular weight polybenzimidazole can be prepared by the method of Vogel and Marvel, J. Polym. Sci., L, 511 (1969), completely incorporated herein by reference. According to their method, polybenzimidazoles are formed by melt polycondensation reaction of an aromatic tetramino compound with various diphenyl esters of aromatic dibasic acids.

In another modification, polybenzimidazoles can be prepared from aromatic tetramines or their hydrochlo-

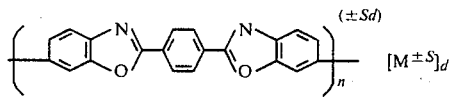

This polymer exhibits reversible n-type and p-type conductivity when it is reduced or oxidized, respectively.

Suitable preferred sulfur-containing recurring units, i.e., benzothiazoles, are disclosed hereinafter. The recurring units occur when R and R' are benzothiazole, b and c are 1, a is 0, Z is S, $R^{ii}$ is H, Y is carbon, X is nitrogen and Y' is m- or p-phenylene.
Poly 2,2'-(p-phenylene)-5,5'-bibenzothiazole:

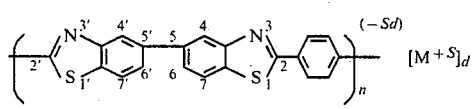

The polymer exhibits reversible N-type conductivity.
Poly 2,2'-(p-phenylene)-6,6'-bibenzothiazole;

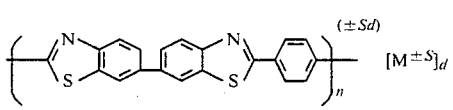

The polymer exhibits reversible N-type and P-type conductivity.
Poly 2,2'-(m-phenylene)-5,5'-bibenzothiazole;

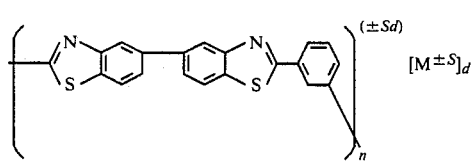

Poly 2,2'-(m-phenylene)-6,6'-bibenzothiazole;

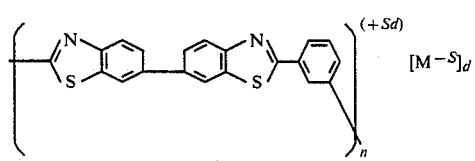

The polymer exhibits reversible P-type conductivity.
The following is a preferred electroactive polymer when a, b, and c are zero and R is pyrido[3,2-d]oxazole or pyrazino[2,3-d]oxazole:
Poly 2,6-(pyrido[3,2-d]oxazole)

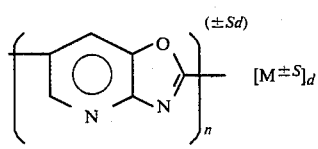

Poly 2,6-(pyrazino[2,3-d]oxazole)

rides and aromatic dicarboxylic acids by a polyphosphoric acid catalyzed condensation described by Iwakura, Uno and Imai, J. Polym. Sci., Part A, 2, 2605 (1964), completely incorporated herein by reference.

The preparation of head to tail 2,5-polybenzimidazoles from self-condensation of 3,4-diamino benzoic acid in polyphosphoric acid solvent is described by Imai, Uno and Iwakura, Macromol. Chem., 83, 179 (1965), completely incorporated herein by reference.

Polybenzimidazoles prepared according to these procedures must be N-alkylated prior to chemical or electrochemical doping of the present invention. The alkylation reaction is well known in the art and is accomplished using conventional alkylating agents such as alkyl halides, alkyl tosylates and sulfates, under basic conditions. For example, according to the procedure of Kapodia and Patel, J. Macromol. Sci., -Chem., A 17 (3), 467 (1982), completely incorporated herein by reference, N-methylpolybenzimidazoles are formed by methylation of polybenzimidazole with dimethylsulfate in the presence of sodium hydroxide.

Because it is difficult to achieve complete alkylation of a high molecular weight polymer by this procedure, the preferred method for the preparation of N-alkyl-polybenzimidazoles involves polymerization N,N'-dialkylated monomer.

For example, N-alkylated polybenzimidazoles were prepared by Korshak, Teplyakov and Fedorova, J. Polym. Sci., A-1, 9, 1027 (1971), completely incorporated herein by reference, by melt polycondensation reaction of N,N-dialkyltetramines with diphenyl esters of aromatic dicarboxylic acids.

Fully aromatic polybenzoxazoles can be prepared by the method of Kubota and Nakanishi, Polymer Letters, 2, 655 (1964), completely incorporated herein by reference. They have carried out a stepwise condensation reaction of 3,3'-dihydroxybenzidine and isophtholoyl chloride, in dimethylacetamide solvent, to a high molecular weight polyamide. In the second step, the polyamide films were dehydrated at 200°–500° C. to a fully aromatic polybenzoxazole. Another modification of their method involves a one-step polycondensation reaction of 3,3'-dehydroxybenzidine or its hydrochloride with isophthalic or terephthalic acid in polyphosphoric acid at 150°–215° C.

The preparation of polybenzoxazoles by a polyphosphoric acid catalyzed polycondensation reaction of 3,3'-dihydroxybenzidine hydrochloride and aromatic dicarboxylic acid is also described by Imai, Taoka, Uno and Iwakura, Macromol. Chem., 83, 179 (1965), completely incorporated herein by reference.

Homopolymerization of a trifunctional monomer such as 3-amino-4-hydroxybenzoic acid leading to a head to tail 2,5-polybenzoxazole is described by Imai, Uno and Iwakura, Macromol. Chem., 83, 179 (1965), completely incorporated herein by reference.

In another modification, aromatic polybenzoxazoles were prepared by Moyer, Cole and Angos, J. Polym. Sci., 3, 2107 (1965), completely incorporated herein by reference, by melt polymerization of 3,3'-dihydroxybenzidine with phenyl esters of phthalic, isophthalic, terephthalic and 5-chloro isophthalic acids.

Aromatic polybenzothiazoles can be prepared from 3,3'-dimercaptobenzidine and diphenyl esters of aromatic dicarboxylic acids by solution polymerization in diethylaniline solvent, followed by isolation and heat treatment at 400° C., for one hour, as described by Hergenrother, Wrasidlo and Levine, J. Polym. Sci., Part A, 3, 1665 (1965), completely incorporated herein by reference. In another modification of their method, high molecular weight polybenzothiazoles were obtained by a one-step polycondensation reaction of 3,3'-dimercaptobenzidine and aromatic dicarboxylic acids in polyphosphoric acid solvent at 200°–250° C.

Polybenzothiazoles can also be prepared by a solution polycondensation reaction of 3,3'-dimercaptobenzidine dihydrochloride and dicarboxylic acids in polyphosphoric acid solvent, using the method of Imai, Taoka, Uno and Iwakura, Macromol., Chem., 83, 167 (1965), completely incorporated herein by reference.

2,6-Polybenzothiazole, a head to tail homopolymer, can be synthesized from 3-mercapto-4-amino benzoic acid hydrochloride or the zinc salt by a solution polymerization in polyphosphoric acid by the procedure of Imai, Uno and Iwakura, Macromol., Chem., 83, 179 (1965), completely incorporated herein by reference.

The fused 5,6-membered heterocyclic rings system polymers, wherein the six-membered rings contain nitrogen, can be fabricated by the above procedures by starting with the appropriate pyridazine, pyridine, or pyrimidines.

TRACTABLE POLYMER FABRICATION

Subsequent to polymerization, articles such as fibers, ribbons, or free-standing films are cast from solution. The solution is formed by dissolving the desired polymer in a solvent which consists of sulfuric acid, formic acid, methane sulfonic or polyphosphoric acid. The solution temperature is from about 25° C. to about 200° C. and preferably at about 140° C., most preferably 100° C. The polymers are coagulated into solid shapes such as fibers, ribbons, or free-standing films in a basic coagulation bath. For free-standing films, the polymers are fabricated from solutions containing about 2 to 25% polymer dissolved in the solvent. At concentrations which exceed 10%, the cast films take on an anisotropic morphology. The anisotropic property enhances the conductivity in the anisotropic direction. An amine, for example triethylamine, dissolved in a protonic solvent such as $H_2O$ and preferably ethyl alcohol comprises the coagulation bath. The bath is maintained at a lower temperature than the dissolution temperature of the polymer in the solvent. Usually room temperature is selected as the operating temperature of the coagulation bath. The fabricated articles are dried. Elevated temperatures, usually 60° C., and reduced pressure accelerated the drying process. Drying is continued until no further weight loss is observed.

Alternatively, films are cast into water, comprising the coagulation bath, followed by neutralization in aqueous bicarbonate. Neutralized films are washed in water and dried at elevated temperatures, 60°–100° C., under reduced pressure.

POLYMER CONDUCTIVITY MODIFICATION

After fabrication of the desired articles from the polyfused heterocyclic polymers by means of the procedure described above, the articles are rendered electroactive by, for example, chemical or electrochemical procedures. The articles can be rendered electroactive in an atmosphere which is inert with respect to the polymer and dopant, by contacting them with suitable conductivity modifiers, i.e. dopants. An inert atmosphere is defined as an atmosphere which does not react with the polymer, the dopant, or the electroactive polymer. For example, the atmosphere can be argon, helium, and nitrogen and the like. The inert liquid medium should be able to wet and swell the polymer but not react with it. The doping can also be carried out in an inert liquid medium such as tetrahydrofuran, acetonitrile and the like. The dopants can be oxidizing or electron accepting molecules, or reducing or electron donating molecules. Both types of dopants may be in the form of gases or vapors, pure liquids or liquid solutions. Preferably, oxygen and water moisture are excluded during and after the doping process because the conductive polymers tend to degrade, i.e. lose conductivity, when exposed thereto.

For example, the polymer can be contacted with alkali naphthalides or alkali anthracenides such as sodium naphthalide, potassium naphthalide, or sodium anthracenide in a tetrahydrofuran solution. The conductivity modifier concentration can be from about 0.001 to about 1 molar and preferably from about 0.01 to about 0.5 molar in the THF or other suitable solvent. Alternative doping methods are taught in U.S. Pat. No. 4,204,216 and incorporated herein by reference.

The electron acceptor or donor dopants oxidize or reduce the polymer and are incorporated as charge compensating ionic dopants. The incorporation of the dopants into the polymer can be observed by a color change in the polymer as well as an enhanced conductivity. For example, a virgin polymer film having a yellow, orange or brown color, changes to a green, blue or black color with a metallic luster upon doping and the measured conductivity increases by many orders of magnitude.

Alternatively, the polymers can be oxidized or reduced to their conductive forms using electrochemical techniques. In this method, herein referred to as electrochemical doping, the polymer is immersed in a suitable electrolyte solution and used as one electrode of an electrochemical cell. Upon passing an electric current through such a cell the polymer becomes reduced (or oxidized, depending upon the direction of current flow) and charge-compensating cations (or anions) from the supporting electrolyte become incorporated into the polymer. This doping also proceeds with the characteristic color change described above. Thus, the polymer can be electrochemically doped with whatever appropriately charged ion is present in the electrolyte solution. Electrolyte solutions are comprised of a salt dissolved in a solvent. Suitable solvents are acetonitrile, tetrahydrofuran, 2-methyl-tetrahydrofuran, propylene carbonate, dimethylformamide, dimethylsulfoxide and the like. Alternative electrolytes are specified in U.S. application Ser. No. 334,509, filed Dec. 28, 1981, entitled "Batteries Fabricated With Electroactive Polymers", and completely incorporated herein by reference. Suitable cations are $Li^+$, $Na^+$, $K^+$, $(CH_3)_4N^+$, $(C_2H_5)_4N^+$ and $(C_4H_9)_4N^+$. Suitable anions are $Cl^-$, $Br^-$, $ClO_4^-$, $BF_4^-$, and $PF_6^-$. The extent of doping can be easily controlled by adjusting the amount of charge electrochemically injected into the polymer, either by controlling the magnitude of the current used (galvanostatic charging) or by controlling the potential of the polymer electrode with respect to a reference electrode (potentiostatic charging).

The above-described electrochemical doping process is completely reversible. The polymer can be "undoped" and returned to its original, neutral, non-conducting state simply by applying a current opposite in sign to that used for the doping process. Upon complete undoping the color of the polymer reverts back to its original color. Thus, for example, a reduced, conducting poly-2,2'-(p-phenylene)-6,6'-bibenzoxazole polymer can be reoxidized completely to its neutral, non-conducting form, and the charge-compensating cations incorporated during the electrochemical reduction process are expelled from the article during electrochemical re-oxidation.

Having described the methods of fabrication and the basic polyfused heterocyclic systems, the following examples are intended to be illustrative of the invention and not meant to limit the scope thereof. Modification which would be obvious to one of ordinary skill in the art are contemplated to be within the scope of the invention.

EXAMPLES

Example 1

Preparation of 2,5-Polybenzoxazole

Monomer Synthesis

Preparation of 3-amino-4-hydroxybenzoic acid

3-Amino-4-hydroxybenzoic acid was prepared according to the procedure of Imai, Uno and Iwakura, Macromol. Chem., 83, 179 (1965).

50 g (0.362 moles) of p-hydroxybenzoic acid was added to 200 ml of nitric acid diluted 1:6 with water, in a 500-ml, three-neck flask provided with a magnetic stirrer, reflux condenser and a heating mantle. The reactants were stirred at room temperature for ½ hour, and at reflux for 16 hours. The product was collected by filtration, washed with water, and dried in vacuo. The yield of 3-nitro-4-hydroxybenzoic acid was 50.9 g, 77% of theory.

20 g (0.109 moles) of 3-nitro-4-hydroxybenzoic acid was suspended in 200 ml of absolute ethanol in a Fisher-Porter pressure bottle provided with a magnetic stirrer. 2.4 g of 5% palladium on carbon was added and the bottle connected to a gas manifold system. The reaction flask was pumped with nitrogen and pressured to 40 psig with hydrogen from a 350-ml hydrogen reservoir. The hydrogenating reaction was carried at for 16½ hours at room temperature at constant pressure. The catalyst was filtered off through celite and the filtrate concentrated to dryness on a rotary evaporator. The product was recrystallized from 85 ml of hot 2N HCl. The yield was 17.5 g, 36% of theory.

| Analysis: | | Calcul. | Found |
|---|---|---|---|
| for $C_7H_8O_3NCl$ | % C | 44.35 | 44.50 |
| | H | 4.25 | 4.18 |
| | N | 7.39 | 7.46 | m.p. 271–275 (dec.).

Thereafter, the polymer was prepared according to the procedure of Imai, Uno and Iwakura cited above.

108.4 g of polyphosphoric acid (Aldrich) was placed in a 250-ml, three-neck flask provided with a mechanical stirrer, reflux condenser and a nitrogen inlet. The flask was placed in an oil bath and heated to 200° C. under a nitrogen blanket. 2.9 g (0.015 moles) of 3-amino-4-hydroxybenzoic acid hydrochloride was added slowly. The polymerization reaction was run at 200° C. for 4 hours.

The hot polymer solution was poured into water where it coagulated into a fiber spindle. Filtered polymer was neutralized in 5% $NaHCO_3$ solution for 15 hours and thoroughly washed with water and ethanol.

After drying in vacuo, 1.2 g, 67% of theory, of polymer was recovered.

| Analysis: | | Calcul. | Found |
|---|---|---|---|
| for $(C_7H_3NO)_n$ | % C | 71.80 | 68.28 |
| | H | 2.58 | 2.63 |
| | N | 11.96 | 11.41 |

EXAMPLE 2

Preparation of 2,6-polybenzothiazole

Monomer Synthesis

Preparation of 3-mercapto-4-amino-benzoic acid

This monomer was prepared according to the procedure of Imai, Uno and Iwakura, Macromol. Chem., 83, 179 (1965).

56.0 g (0.408 moles) of p-amino benzoic acid and 120 g of ammonium thiocyanate dissolved in 670 ml of glacial acetic acid in a 2-liter, three-neck flask, provided with a reflux condenser, drying tube, magnetic stirrer and an addition funnel. 24 g of $Br_2$ in 234 ml of glacial acetic acid was added dropwise. After ½ hour of stirring at room temperature, the reaction mixture was filtered. 2-amino-6-carboxybenzothiazole hydrobromide crystallized out on standing. The product was recrystallized from water-HCl to give 21.6 g 23% yield of 2-amino-6-carboxybenzothiazole hydrochloride.

20 g (0.087 moles) or 2-amino-6-carboxybenzothiazole was dissolved in hot solution of 100 g of KOH in 100 ml of water. The solution was cooled and neutralized to pH 7 with 85 ml of conc. HCl with cooling in ice. The neutralized solution was filtered into a solution of 20 g of $ZnCl_2$ in 50 ml of water. 25 ml of acetic acid was added and the product collected by filtration. The crude product was recrystallized from 300 ml of 1N HCl-conc. HCl to give 13.5 g, 76% of crystalline monomer.

| Analysis: | | Calcul. | Found |
|---|---|---|---|
| | % C | 40.88 | 40.99 |
| | H | 3.92 | 3.73 |
| | N | 6.81 | 6.83 |

Thereafter, the polymer was prepared from the above monomer according to the procedure of Imai, Uno and Iwakura cited above.

2.9 g (0.014 moles) of 3-mercapto-4-aminobenzoic acid hydrochloride was added to 107 g of polyphosphoric acid (Aldrich) in a 250-ml, three-neck flask provided with a reflux condenser. The flask was immersed into an 180° C. oil bath and the reaction continued for 1 hour. The polymer was coagulated in water, neutralized in 5% aqueous $NaHCO_3$ solution and thoroughly washed and dried. 1.8 g, 95% of polymer, was recovered.

| Analysis: | | Calcul. | Found |
|---|---|---|---|
| | % C | 63.14 | 59.58 |
| | H | 2.27 | 2.29 |
| | N | 10.52 | 9.81 |
| | S | 24.07 | 20.8 |

$N_{sp}=0.145$ (0.2 g/100 ml of $H_2SO_4$ @ 30° C.).

Example 3

Poly-2,2'-(p-phenylene)-6,6'-bibenzoxazole

Monomer Synthesis

Preparation of o-dihydroxybenzidine o-Dihydroxybenzidine was prepared from o-dianisidine according to the procedure of Burkhardt and Wood, J. Chem. Soc., 1929, 15. 50 g of o-dianisidine dihydrochloride was heated at reflux with 475 ml of HI (47%), under $N_2$, for 48 hours, excess HI was distilled off on a water bath and a saturated solution of sodium acetate added. The white precipitate was washed with ethanol and then boiled with 30 ml of ethanol to remove unreacted starting material. The product was collected by filtration, washed and dried. The yield was 90%. The product was recrystallized twice from $H_2O$—HCl.

| Analysis: | | Calcul. | Found |
|---|---|---|---|
| $C_{12}H_4O_3N_2O_2Cl_2$ | % C | 49.84 | 49.80 |
| | H | 4.88 | 4.80 |
| | N | 9.69 | 9.55 |

Thereafter, the polymer was prepared from the above monomer according to the procedure of Imai, Taoku, Uno and Iwakura, Macromol. Chem., 83, 167 (1965).

54 g of polyphosphoric acid (Aldrich) was heated, under an $N_2$ blanket, to 200° C. in a 250-ml, three-neck flask fitted with a mechanical stirrer, reflux condenser and a nitrogen inlet. 2.7042 g (9.352 mmoles) of o-dihydroxybenzidine dihydrochloride was added slowly, to control foaming, followed by 1.5545 g (9.357 mmoles) of sublimed terephthalic acid. Heating was continued at 200° C. for 2 hours. The polymer was coagulated in water forming a fibrous spindle. The polymer was filtered and neutralized in 5% $NaHCO_3$ solution for 16 hours, washed in $H_2O$ and dried. The yield of polymer was quantitative.

| Analysis: | | Calcul. | Found |
|---|---|---|---|
| $(C_{20}H_{10}O_2N_2)_n$ | % C | 77.41 | 67.87 |
| | H | 3.25 | 3.07 |
| | N | 9.03 | 7.91 |

$N_{sp}=0.150$ (0.2 g/100 ml, $H_2SO_4$), 30° C.

Example 4

Preparation of Films and Wires

A 4.4% (wt.) solution of poly 2,2'-(p-phenylene)-6,6'-bibenzoxazole (Example 3) in polyphosphoric acid was prepared by dissolving 1.32 g of polymer in 28.55 g of polyphosphoric acid at 150° C. under nitrogen. Free standing films were cast from this solution and coagulated in $H_2O$ or a 10% solution of triethylamine in ethanol. Similarly, platinum wires, for electrochemical studies, were coated with the polymer solution and coagulated in the above baths. Following coagulation in water, the films were neutralized in a 5% solution of $NaHCO_3$. Following neutralization, films were thoroughly washed and dried in vacuo of 70° C.

Example 5

Chemical Doping of 2,6-Polybenzothiazole

A transparent brown film of the polymer of Example 2 was placed in a jar, in a dry box with a dry argon atmosphere. After 30 minutes, a dimethoxyethane solution of 0.1M sodium naphthalide was poured into the jar. The film reacted immediately, changing to a dark blackish color. The doped film was measured by a standard four point probe conductivity measurement. The four point probe procedure is described in U.S. application Ser. No. 370,231, filed Apr. 22, 1982, entitled "Electroactive Polymers", and incorporated herein by reference. The measured conductivity of the polymer was 0.04 ohm$^{-1}$ cm$^{-1}$. Upon exposure to air, the dark color disappears instantly and the polymer resumes its original color. The infrared spectra of the original undoped film and the air-exposed doped film were the same. The infrared of the dark, sodium naphthalide doped film was opaque with no transmittance between 4000 and 200 cm$^{-1}$, indicating metallic behavior. This experiment shows that the doped polymer films are surprisingly good electrical conductors.

Example 6

Electrochemical Doping of Example 3

A 5-inch platinum wire was coated with a thin film of the polymer of Example 3, by dipping the wire into a 5% solution of the polymer in polyphosphoric acid. The film-coated wire was coagulated in water, neutralized in 5% sodium bicarbonate solution, washed in H$_2$O, and dried in a vacuum oven at 60° C.

The polymer-coated wire was connected to an E.G. and G. Princeton Applied Research Apparatus comprising a Universal programmer and a Potentiostat/-Galvanostat, with recorder. The polymer-coated end of the wire was then immersed into a 0.1M solution of tetraethylammonium tetrafluoroborate in acetonitrile. A linear potential sweep, varying from 0 to $-2.5$ volts vs. SCE was applied to the polymer-coated wire. A cathodic current began to flow when the potential reached $-1.7$ volts, and two cathodic current peaks were observed at $-2.0$ and $-2.4$ volts. This indicates the sequential uptake of two electrons by the polymeric repeat units. At this point, the polymer is negatively charged and contains tetraethylammonium cations as the charge-compensating dopant species. In effect, the polymer was made electroactive by the application of a potential of about $-2$ volts in the presence of an electrolyte solution capable of providing charge-compensating dopant ions. Upon reversing the direction of the potential sweep, two anodic current peaks were observed at nearly the same voltages. This indicates reversible removal of the two electrons previously injected into the polymer. This procedure returns the polymer to its original uncharged, undoped state.

Example 7

Electrochemical Doping of Free-standing Films of Example 4

A ½" diameter disc of a 1 mil thick film of the polymer of Example 4 was immersed in an electrolyte solution of 0.1M tetraethylammonium tetrafluoroborate and tightly held up against flat gold-coated electrode with a fine nylon mesh screen. This electrode was connected to the same apparatus described in Example 6. As the potential of the gold-coated electrode in contact with the polymer was brought negative of $-1.7$ volts, the initially pale brown transparent polymer film became dark and opaque. After holding the potential of the electrode at $-2.2$ volts vs. SCE for approximately 5 minutes, the film was removed from the electrochemical cell, rinsed with acetonitrile to remove any excess electrolyte solution and allowed to dry in an argon atmosphere. Four point probe conductivity measurement of the resulting electrochemically doped film reveals a conductivity of 0.05 ohm$^{-1}$ cm$^{-1}$. In effect, the polymer film was doped to a conductive state by the application of a potential of $-2.2$ volts in the presence of an electrolyte solution. This corresponds to reduction of the polymer to an N-type conducting state.

Example 8

Electrochemical Doping of a 2,6-polybenzothiazole

A platinum wire was coated with a thin film of 2,6-polybenzothiazole (Example 2) using the procedure described in Example 6. The wire was immersed in a solution of 1.5 molar lithium perchlorate in tetrahydrofuran and connected to the electrochemical apparatus as described in Example 6. A potential, varying between 0 and $-3.0$ volts vs. SCE was applied to the polymer-coated wire. Upon sweeping the potential below $-1.5$ volts, a cathodic current was observed which peaked between $-1.9$ and $-2.1$ volts. Upon reversal of the potential sweep, an anodic current peak was observed at $-1.7$ volts.

This behavior indicates an initial resistance to passage of current followed by a rapid uptake of electrons resulting in a charged electroactive polymer containing lithium ions as the charge-compensating dopant. In effect, the polymer was made electroactive by the application of a potential of about $-2$ volts in the presence of an electrolyte solution capable of providing a charge-compensating dopant.

Upon sweeping the potential of the polymer-coated wire in the positive direction, an anodic current was observed positive of $+1.2$ volts, peaking at about $+1.4$ volts vs. SCE. This indicates that the polymer has been oxidized to a cationic form containing BF$_4^-$ counterions from the electrolyte solution. Upon reversal of the potential sweep, a cathodic current peak was observed at the same voltage, indicating that the polymer was reduced back to its original neutral form. In effect, the polymer was rendered electroactive by applying a potential of abouat $+1.5$ volts vs. SCE in the presence of an electrolyte solution capable of providing charge-compensating dopant ions.

Example 9

Preparation of Poly 2,2'-(m-phenylene)-6,6'-bibenzoxazole

The polymer was prepared by a modified procedure of Imai Taoka, Uno and Iwakura, *Macromol Chemistry*, 83, 167 (1965).

2.0825 g (7.202 mmoles) of r-dihydroxy benzidine dihydrochloride and 50 g polyphosphoric acid (Aldrich) were placed in a 250 ml three-neck flask provided with a mechanical stirrer, reflux condenser, and a nitrogen inlet. The solution was stirred at room temperature for 6 hrs. and at 60° C. overnight. The temperature was then raised to 110° C., and 1.1969 g (7.205 mmoles) of isophthalic acid and 30 g of polyphosphoric acid were added. The polymerization temperature was slowly raised to 165° C. over a five-hour period. The reaction was continued at 165° C. for 12 hrs., followed by 12 hrs at 195° C. The hot polymer solution was poured into 2 l of water under rapid stirring. The coagulated polymer formed a fiber spindle which broke into a powder on further stirring. The polymer was filtered and neutralized in 5% NaHCO₃ solution overnight. Following neutralization, the polymer was washed with water and continuously extracted with methanol overnight. Upon drying in vacuo, 2.04 g (91.5% yield) of brown polymer was recovered.

| Analysis: | | Calcul. | Found |
|---|---|---|---|
| $(C_{20}H_{10}O_2N_2)_n$ | % C | 77.41 | 74.01 |
| | H | 3.25 | 3.34 |
| | N | 9.03 | 8.74 |

Example 10

Preparation of Films and Wires

Free standing films of the polymer of Example 9 were cast from a 5% solution of the polymer in methane sulfonic acid at room temperature. Films were cast on glass plates which were immersed into a 10% solution of triethylamine in ethanol for coagulation. Neutralized films separated from the glass plates and were washed exhaustively in ethanol. Films were dried in vacuo at 70° C. Platinum coated wires, for electrochemical studies, were prepared similarly.

Example 11

Electrochemical Doping

The polymer coated wire of Example 10 was connected to an E.G. and G. Princeton Applied Research Apparatus comprising a Universal programmer and a potentiostat/galvanostat with recorder. The polymer coated end of the wire was then immersed into a 0.1M solution of tetraethylammonium tetrafluoroborate in acetonitrile. A linear potential sweep, varying from 0 to 18 V vs. SCE was applied to the polymer coated wire. An anodic current began to flow when the potential reached +1.2 V and an anodic current peak was observed at +1.5 V. At this point the polymer is positively charged and contains tetrafluoroborate anions as the charge-compensating dopant species. In effect, the polymer was made electroactive by the application of a potential of about +1.5 V in the presence of an electrolyte solution capable of providing charge-compensating dopant ions. Upon reversing the direction of the potential sweep a cathodic peak was observed at nearly the same voltage. This indicated injection of an electron previously removed from the polymer. This procedure returns the polymer to its original uncharged, undoped state.

Example 12

Preparation of Poly 2,2'-(p-phenylene)-5,5-bibenzoxazole

Monomer Synthesis of 3,3'-Diamino-4,4'-Dihydroxybiphenyl 100 ml of 70% nitric acid was added dropwise, from an addition funnel, to a solution of 60 g (0.322 moles) of p,p'-biphenol in 1 l of acetic acid in a 2 l 3-neck flask fitted with a mechanical stirrer and a reflux condenser with a drying tube. The reaction flask was cooled in ice. After the addition was complete, the reaction mixture was allowed to warm to room temperature. The yellow product was filtered, washed with acetic acid and water, and dried in vacuo at 70° C. to give 67.1 g (85.3% yield) of crude product. 3,3'-dinitro-4,4'-dihydroxybiphenyl was recrystallized from acetic acid.

6.8 g (0.028 moles) of 3,3'-dinitro-4,4-dihydroxybiphenyl was hydrogenated over 1 g of 5% palladium on carbon in acetic acid at 50 psig of hydrogen. The hydrogenation was run for 2.1 hrs. at room temperature. 3,3'-diamino-4,4'dihydroxybiphenyl was isolated in 54% yield as the dihydrochloride salt.

| Analysis: | | Calcul. | Found |
|---|---|---|---|
| $C_{12}H_{14}N_2O_2Cl_2$ | % C | 49.84 | 48.84 |
| | H | 4.88 | 4.97 |
| | N | 9.69 | 9.28 |

Thereafter the polymer was prepared according to the procedure of Example 9, using 2.055 g (7.107 mmoles) of 3,3'-diamino-4,4'-dihydroxybiphenyldihydrochloride, 1.1866 g (7.143 mmoles) of terephthalic acid, and 80 g of polyphosphoric acid. The polymer was isolated as a greenish-brown powder.

| Analysis: | | Calcul. | Found |
|---|---|---|---|
| $(C_{20}H_{10}O_2N_2)_n$ | % C | 77.41 | 72.89 |
| | H | 3.25 | 3.23 |
| | N | 9.03 | 8.19 |

The polymer had the formula:

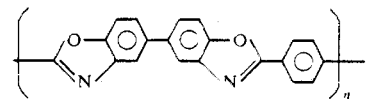

Example 13

Electrochemical Doping of Free-standing Films of Example 4

A film of the polymer of Example 4 was held lightly up against a flat platinum electrode in the same electrolyte solution as Example 4. After holding the potential of the electrode at +1.7 V vs. SCE for 12 minutes, the polymer was removed from the electrochemical cell, rinsed with acetonitrile and allowed to dry. Four point probe conductivity measurement of the resulting electrochemically doped film revealed a conductivity of $2.3 \times 10^{-2}$ ohm$^{-1}$ cm$^{-1}$. In effect, the polymer film was doped to a conductive state by application of a potential of +1.7 volts in the presence of an electrolyte solution. This corresponds to oxidation of the polymer to a P-type conducting state.

Example 14

Electrochemical Doping of Poly 2,2'-(m-phenylene)-6,6'-bibenzoxazole

A ½" diameter disc of a 1 mil thick film of the polymer of Example 10 was immersed in an electrolyte solution of 0.1M tetraethylammonium tetrafluoroborate in acetonitrile and tightly held up against a flat platinum electrode with a fine nylon screen. This electrode was connected to the same apparatus described in Example 6. The potential of the platinum electrode in contact with the polymer was brought to −2 V vs. SCE and held for 8 minutes. The film was then removed from the electrochemical cell, rinsed with acetonitrile to remove any excess electrolyte solution, and allowed to dry in an argon atmosphere. Four point probe conductivity measurement of the resulting electrochemically doped film revealed a conductivity of $2\times 10^{-2}$ ohm$^{-1}$ cm$^{-1}$. In effect, the polymer film was doped to a conductive state by the application of a potential of +2 volts in the presence of an electrolyte solution. This corresponds to oxidation of the polymer to a P-type conducting state.

Example 15

Preparation of Poly-2,2'-(p-phenylene)-6,6'-bibenzothiazole

Monomer Synthesis o-Dimercaptobenzidine was prepared by the procedure described in Houben-Weyl, *Methoden der Organischen Chemie.*, E. Miller Ed., IX, 39 (1955), incorporated herein by reference.

50 g (0.271 mol) of benzidine (Fluca) was dissolved in 670 ml of acetic acid in a 2 l, 3-neck flask fitted with a mechanical stirrer and a reflux condenser. 165 g (2.1 mol) of NH$_4$SCN was added forming a voluminous precipitate. 32.4 ml of Br$_2$ in 250 ml of acetic acid was added dropwise to the stirred reaction mixture.

Stirring was continued at room temperature overnight. The yellow precipitate was then filtered off and washed with acetic acid. 2,2'-diamino-6,6'-bibenzothiazole was recrystallized from 10 l of H$_2$O + 34 ml of HCl by acidification with conc. HCl.

2,2'-diamino-6,6'-bibenzoxazole was added to a solution of 54 g of KOH in 372 ml of water and refluxed under nitrogen for 3 hrs. The solid which separated on cooling was filtered off under nitrogen and recrystalized from 1:2 HCl—H$_2$O. 44.6 g (51%) of o-dimercaptobenzidine dihydrochloride was recovered.

| Analysis: | | Calcul. | Found |
|---|---|---|---|
| C$_{12}$H$_4$N$_2$S$_2$Cl$_2$ | % C | 44.86 | 45.43 |
| | H | 4.39 | 4.33 |
| | N | 8.72 | 8.80 |
| | S | 19.96 | 20.00 |

Polymer Synthesis 2.4721 g (7.6943 mmoles) of o-dimercaptobenzidine dihydrochloride and 1.5631 g (7.6992 mmoles) of terephthaloyl chloride (Aldrich, recrystallized) in 44 g of polyphosphoric acid (Aldrich, 85%) was mechanically stirred and heated under nitrogen as follows: 60° C. overnight, heated to 165° C. over 5 hours, 165° C. for 12 hrs, and 195° C. for 12 hours. The polymerization mixture turned dark brown and became very viscous. It was diluted with 60 g of PPA and then poured into 1 l of H$_2$O. The coagulated polymer was ground up in a blender, neutralized in a 5% solution of NaHCO$_3$ and washed with water. It was then transferred into a Soxhlet extractor where it was extracted with methanol overnight. After drying in vacuo at 70° C., 2.53 g (90%) of poly 2,2'-(p-phenylene)-6,6'-bibenzothiazole was recovered.

| Analysis: | | Calcul. | Found |
|---|---|---|---|
| C$_{20}$H$_{10}$H$_2$S$_2$ | % C | 70.15 | 69.27 |
| | H | 2.94 | 2.95 |
| | N | 8.18 | 8.25 |

| Analysis: | Calcul. | Found |
|---|---|---|
| S | 18.73 | 18.40 |

Example 16

Chemical Doping of Poly 2,2'-(p-phenylene)-6,6'-bibenzothiazole

A transparent brown film of the polymer of Example 15 was placed in a jar in a dry box with a dry argon atmosphere. After 30 minutes, a dimethoxyethane solution of 0.1M sodium naphthalide was poured into the jar. The film reacted immediately, changing to a metallic blue color. The doped film was measured by a standard four point probe conductivity measurement. The four point probe procedure is described in U.S. application Ser. No. 370,231, filed Apr. 22, 1982, entitled "Electroactive Polymers", and incorporated herein by reference. The measured conductivity of the polymer was 0.02 ohm$^{-1}$ cm$^{-1}$. Upon exposure to air, the dark color disappears instantly and the polymer resumes its original color. The infrared spectra of the original undoped film and the air-exposed doped film were the same. The infrared of the dark, sodium naphthalide doped film was opaque with no transmittance between 4000 and 200 cm$^{-1}$, indicating metallic behavior. This experiment shows that the doped polymer films are surprisingly good electrical conductors.

Example 17

Electrochemical Doping of Example 15

A 5-inch platinum wire was coated with a thin film of the polymer of Example 15 by dipping the wire into a 2.5% solution of the polymer in methanesulfonic acid. The film coated wire was coagulated in water, neutralized in 5% sodium bicarbonate solution, washed in water, and dried in vacuo at 60° C.

The polymer coated wire was connected to an E.G. and G. Princeton Applied Research Apparatus comprising a Universal programmer and a potentiostat/galvanostat with recorder. The polymer-coated end of the wire was then immersed into a 0.1M solution of tetraethylammonium tetrafluoroborate in acetonitrile. A linear potential sweep, varying from 0 to −2.5 V vs. SCE was applied to the polymer coated wire. A cathodic current began to flow when the potential reached −1.5 volts, and two cathodic current peaks were observed at −1.7 and −2 volts. This indicates the sequential uptake of two electrons by the polymeric repeat units. At this point, the polymer is negatively charged and contains tetraethylammonium cations as the charge-compensating dopant species. In effect, the polymer was made electroactive by the application of a potential of about −2 volts in the presence of an electrolyte solution capable of providing charge-compensating dopant ions. Upon reversing the direction of the potential sweep, two anodic current peaks were observed at nearly the same voltages. This indicates reversible removal of the two electrons previously injected into the polymer. This procedure returns the polymer to its original uncharged, undoped state.

Example 18

Preparation of Poly 2,2'-(m-phenylene)-6,6'-bibenzothiazole 2.5153 g (7.8288 mmoles) of o-dimercaptobenzidine and 1.5899 g (7.8312 mmoles) of isophthaloyl chloride (Aldrich, recrystallized) in 44 g of polyphosphoric acid (Aldrich, 85%) was stirred mechanically and heated under nitrogen as follows: room temperature for 2 hours, 60° C. for 2 hours, 110° C. for 1 hour, heated to 165° C. for 2.5 hours, 165° C. for 12 hours, and 195° C. for 12 hours.

In the course of heating, the polymerization mixture turned dark brown and viscous.

The polymer was coagulated in H2O, neutralized in 5% NaHCO3 solution, filtered and washed. It was then continuously extracted with methanol overnight and dried in vacuo. 2.6 g of poly 2,2'-(m-phenylene)-6,6'-bibenzothiozole (98%) was recovered.

| Analysis: | | Calcul. | Found |
|---|---|---|---|
| $C_{20}H_{10}N_2S_2$ | % C | 70.15 | 68.50 |
| | H | 2.94 | 3.08 |
| | N | 8.18 | 7.69 |
| | S | 18.73 | 17.10 |

Example 19

Electrochemical Doping of Example 18

A 5-inch platinum wire was coated with a thin film of the polymer of Example 18 by dipping the wire into a 2.5% solution of the polymer in methanesulfonic acid. The film-coated wire was coagulated in water, neutralized in 5% sodium bicarbonate solution, washed in H2O, and dried in vacuo at 60° C.

The polymer coated wire was connected to an E.G. and G. Princeton Applied Research Apparatus comprising a Universal programmer and a potentiostat/galvanostat with recorder. The polymer coated end of the wire was then immersed into a 0.1M solution of tetraethylammonium tetrafluoroborate in acetonitrile. A linear potential sweep, varying from 0 to +1.8 volts vs. SCE was applied to the polymer coated wire. An anodic current began to flow when the potential reched +1.2 volts, and an anodic current peak was observed at +1.7 volts. At this point, the polymer is positively charged and contains tetrafluoroborate anions as the charge-compensating dopant species. In effect, the polymer was made electroactive by the application of a potential of about +1.7 volts in the presence of an electrolyte solution capable of providing charge-compensating dopant ions. Upon reversing the direction of the potential sweep, a cathodic current peak was observed at nearly the same voltage. This indicates reversible injection of an electron previously removed from the polymer. This procedure returns the polymer to its original uncharged, undoped state.

Example 20

Preparation of Poly 2,2'-(N-methyl-p,p'-aminodiphenylene)-6,6'-bibenzoxazole

Monomer Synthesis

Preparation of N-methyl-4,4'-dicarboxydiphenylamine

A 1 l 3-neck flask fitted with mechanical stirrer, reflux condenser, addition funnel and a drying tube was charged with 272 g of dimethyl formamide (3.4 mol) and cooled in ice. 160 g (1.05 mol) of POCl3 was added dropwise, followed by 30 g (0.164 mol) of N-methyldiphenylamine (Aldrich). The temperature was raised to 90° C. and maintained for 118 hrs.

The reaction mixture was quenched in ice and neutralized to pH 6 with NaOH. The precipitate was filtered off, washed and dried to give 28 g of crude product. After chromatography on silica gel and recrystallization from ethanol, 18 g of pure dialdehyde was recovered.

| Analysis: | | Calcul. | Found |
|---|---|---|---|
| $C_{15}H_{13}NO_2$ | % C | 75.30 | 75.65 |
| | H | 5.47 | 5.33 |
| | N | 5.86 | 5.87 |

Ag2O was prepared by adding 21.4 g of AgNO3 in 125 ml of water to a solution of 5.4 g of NaOH in 54 ml of water. The precipitate Ag2O was filtered off and suspended in a solution of 22.3 g of NaOH in 232 ml of water. 11 g (0.046 mol) of the dialdehyde was added and stirred vigorously for 25 minutes. The reaction mixture was filtered, cooled in ice, and acidified to about pH 3 with HCl. After filtration and drying, 8.9 g (71%) of N-methyl-4,4'-dicarboxydiphenylamine was obtained.

| Analysis: | | Calcul. | Found |
|---|---|---|---|
| $C_{15}H_{13}NO_4$ | % C | 67.12 | 67.02 |
| | H | 4.73 | 4.77 |
| | N | 5.16 | 5.20 |

Polymer Synthesis 1.9984 g (6.9111 mmoles) of o-dihydroxybenzidine dihydrochloride was polymerized with 1.8737 g (6.9066 mmoles) of N-methyl-4,4'-dicarboxydiphenylamine in 42 g of polyphosphoric acid according to the procedure of Example 19.

2.52 g (88%) of poly 2,2'-(N-methyl-p,p'-aminodiphenylene)-6,6'bibenzoxazole polymer of the following structure was obtained:

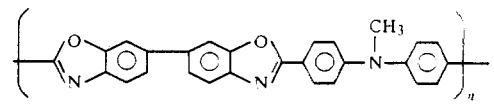

| Analysis: | | Calcul. | Found |
|---|---|---|---|
| $C_{27}H_{17}N_3O_2$ | % C | 78.09 | 63.73 |
| | H | 4.13 | 3.67 |
| | N | 10.12 | 3.13 |

Example 21

Electrochemical Doping of Example 20

A 5-inch platinum wire was coated with a thin film of the polymer of Example 20 by dipping the wire into a 5% solution of the polymer in methanesulfonic acid. The film coated wire was coagulated in water, neutralized in 5% sodium bicarbonate solution, washed in water, and dried in vacuo at 60° C.

The polymer coated wire was connected to an E.G. and G. Princeton Applied Research Apparatus comprising a Universal programmer and a potentiostat/galvanostat, with recorder. The polymer coated end of the wire was then immersed into an 0.1M solution of tetraethylammonium tetrafluoroborate in acetonitrile. A linear potential sweep varying from 0 to +1.3 V vs. SCE was applied to the polymer coated wire. An anodic current began to flow at +0.6 V, and an anodic current peak was observed at +1.1 V. This indicates removal of electrons from the polymer. At this point, the polymer is positively charged and contains tetrafluoroborate anions as the charge-compensating dopant species. In effect, the polymer was made electroactive by the application of a potential of about +1.2 volts in the presence of an electrolyte solution capable of providing charge-compensating dopant ions.

What is claimed is:

1. A tractible electroactive polymer which comprises a charged polymer backbone of diradical recurring units of a fused 5, 6-membered unsaturated ring system wherein the 5-membered ring contains at least one nitrogen and a second heteroatom selected from the group consisting of O, S, Se, Te, and substituted N, and a sufficient concentration of a charge-compensating ionic dopants associated therewith, wherein the polymer backbone is capable of undergoing a reversible oxidation or a reversible reduction or both to form said charged polymer backbone, and wherein the substituents for substituted N are selected from the group consisting of lower alkyl $C_1$-$C_6$, aryl, cycloalkyl, and alkoxy.

2. The electroactive polymer according to claim 1 wherein the recurring units are selected from the group consisting of N-substituted benzimidazoles, benzoxazoles, benzothiazoles, benzoselenazoles, oxazolo[5,4-d]pyrimidine; oxazolo[5,4-b]pyridine; thiazolo[4,5-d]pyrimidine; thiazolo[4,5-d]pyridazine; thiazolo[5,4-d]pyrimidine; thiazolo[4,5-d]pyridine; thiazolo[5,4-b]pyridazine; thiazolo[4,5-c]pyridine; oxazolo[5,4-c]pyridazine; oxazolo[4,5b]pyridine, oxazolo[4,5-c]pyridine; thiazolo[5,4-c]pyridine; oxazolo[4,5-d]pyridazine; thiazolo[5,4-c]pyridazine; oxazolo[5,4-c]pyridine, thiazolo[4,5-b]pyrazine, substituted derivatives thereof, and mixtures thereof.

3. The electroactive polymer according to claim 2 wherein the diradical recurring units are selected from the group consisting of N-substituted benzimidazoles benzoxazoles, benzothiazoles, or mixtures thereof.

4. The electroactive polymer according to claim 3 wherein the recurring units are linked into the polymer chain in the 2,5 or 2,6 positions.

5. The electroactive polymer according to claim 4 wherein the 6-membered ring is substituted with a halogen, phenyl group, or a methoxy group.

6. The electroactive polymer according to claim 4 wherein the fused 5,6-membered heterocyclic recurring units are interspersed with connecting units selected from the group consisting of phenylene —CH=CH—, and

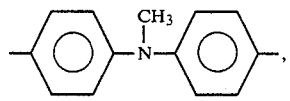

and mixtures thereof.

7. The electroactive polymer according to claim 6 or 3 wherein the 6-membered ring is substituted with a halogen, phenyl group, or a methoxy group.

8. The electroactive polymer according to claim 6, wherein the charge-compensating ionic dopant is a cation selected from the group consisting of the alkali metal ions, alkali earth metal ions, Group III metal ions,

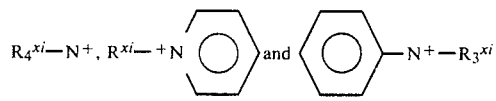

wherein $R^{xi}$ is a straight- or branched-chain alkyl of $C_1$-$C_6$ groups, or mixtures of said cations and the charged polymer backbone is selected from the group consisting of poly 2,2'-(p-phenylene)-5,5'-bibenzoxazole, poly 2,2'-(p-phenylene)-5,5'-bibenzothiazole; or poly 2,2'-(p-phenylene)-1,1'-dimethyl-5,5'bibenzimidizole.

9. The electroactive polymer according to claim 6, wherein the charge-compensating ionic dopant is an anion selected from the group consisting of $AsF_4^-$, $AsF_6^-$, $ClO_4^-$, $PF_6^-$, $SO_3CF_3^-$, $BF_4^-$, $NO_3^-$, $POF_4^-$, $CN^-$, $SiF_5^-$, $SbCl_6^-$, $SbF_6^-$, $HSO_4^-$, acetate, benzoate, tosylate, or mixtures thereof, and the charged polymer backbone is selected from the group consisting of poly 2,2'-(m-phenylene)-6,6'bibenzoxazole, poly 2,2'-(m-phenylene)-6,6'bibenzothiazole; poly 2,2'-(m-phenylene)-1,1'-dimethyl-6,6'-bibenzimidazole, or poly 2,2'-(N-methyl-p,p'-aminodiphenylene)-6,6'bibenzoxazole.

10. The electroactive polymer according to claim 6, wherein the charge compensating ionic dopant can be either an anion or cation, and the charged polymer backbone is selected from the group consisting of poly 2,2'-(p-phenylene)-6,6'bibenzoxazole, poly2,2'-(p-phenylene)-6,6'bibenzothiazole, or poly 2,2'-(p-phenylene)-1,1'dimethyl-6,6'bibenzimidazole.

11. An electroactive polymer which comprises a charged polymer backbone and charge-compensating ionic dopants associated therewith of the formula:

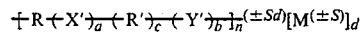

wherein a is 0 to 1; b is 0 or 1; C is 0 or 1; n is an integer from 1 to 1,000; d is an integer from 1 to 2,000; s is an integer 1, 2 or 3; R is a fused nitrogen-containing 5-, 6-membered unsaturated diradical-heterocyclic ring system; R' is the same as R or a different fused unsaturated heterocyclic ring system; X' is a connecting unit; Y' is the same connecting unit as X' or a different connecting unit; and M is a charge-compensating ionic dopant of opposite electrical charge to the charge of the polymer backbone, wherein the polymer backbone is capable of undergoing a reversible oxidation or a reversible reduction or both to form said charged polymer backbone, and wherein said X' or Y' connecting unit is selected from the group consisting of:

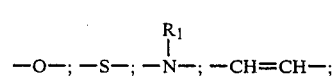

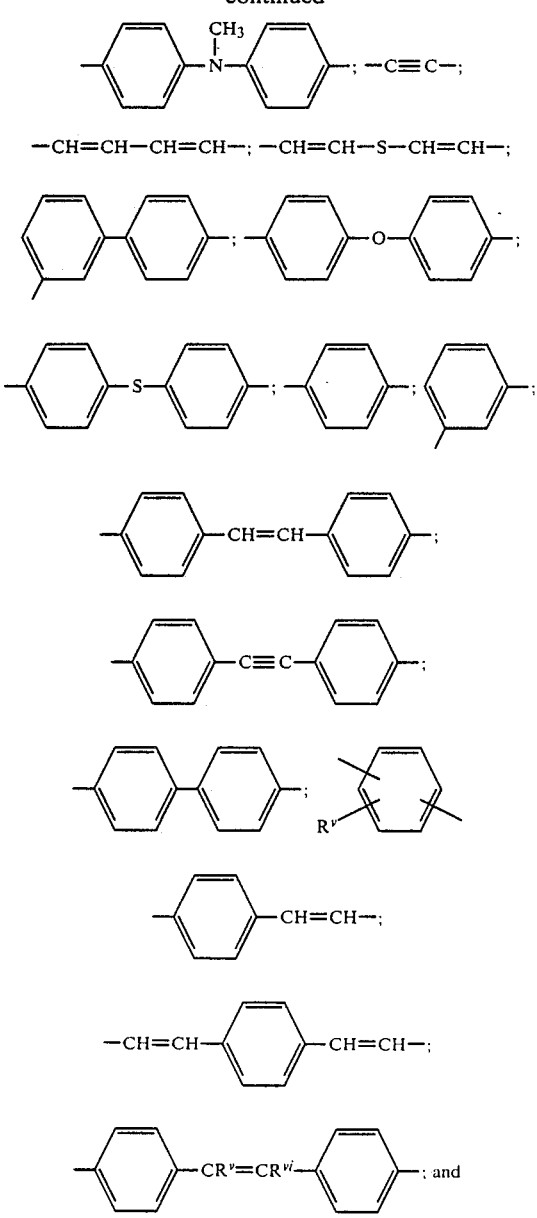

wherein $R_1$ lower alkyl $C_1$-$C_6$, aryl, cyclo alkyl, and alkoxy, and $R^v$, $R^{vi}$ and $R^{vii}$ are H or methyl, methoxy, halogen and mixtures thereof, and Ar is phenylene or biphenylene.

12. The electroactive polymer according to claim 11 wherein R and R' are 2,5 or 2,6 diradicals of the formula:

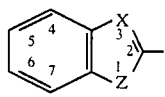

wherein X is N, and Z is selected from the group consisting of substituted N, O, S, Se, and Te.

13. The electroactive polymer according to claim 11, wherein R and R' are diradicals of the formula:

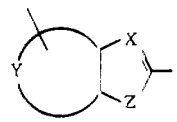

wherein Y is a six-membered ring selected from the group consisting of pyridine, pyrimidine, pyridazine, X is N and Z is selected from the group consisting of substituted N, O, S, Se and Te.

14. The electroactive polymer according to claim 11 wherein R and R' are diradicals of the formula:

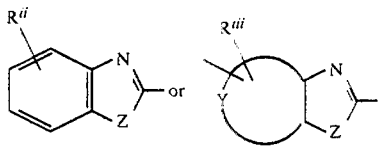

wherein $R^{ii}$ is from one to three substituent groups independently selected from H; alkyl of 1 to 4 carbon atoms; alkoxy of 1 to 4 carbon atoms; an alkylthio of 1 to 4 carbon atoms; a cycloaliphatic group of 5 or 6 carbon atoms; an aryl group of 6 to 10 carbon atoms; an aryl group of 6 to 10 carbon atoms substituted by 1 to 3 alkyl groups of 1 to 4 carbon atoms, alkoxy groups of 1 to 4 carbon atoms, 1 to 3 cyano groups, 1 to 3 halogen atoms, dialkyl amino groups of 1 to 4 carbon atoms, an alkylthiol of 1 to 4 carbon atoms; a 5- or 6-member nitrogen-containing unsaturated heterocyclic group, and $R^{iii}$ is from one to two substituent groups independently selected from the substituent groups for $R^{ii}$.

15. The electroactive polymer according to claim 14, wherein b and c are 1 and a is 0 and the polymer has the formula:

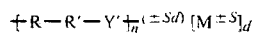

16. The electroactive polymer according to claim 15, further wherein a is 0, b and c are zero, and the polymer has the formula:

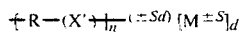

17. The electroactive polymer according to claim 16, further wherein a is zero, and the polymer has the formula:

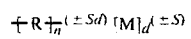

18. The electroactive polymer according to claim 15, wherein M is a cation and the polymer is selected from the group consisting of:

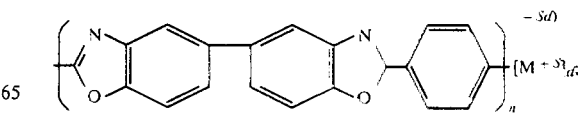

or

-continued

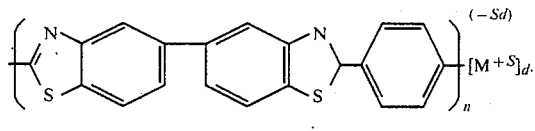

19. The electroactive polymer according to claim 15, wherein M is an anion and the polymer is selected from the group consisting of:

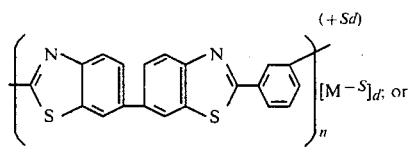

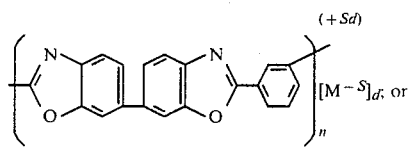

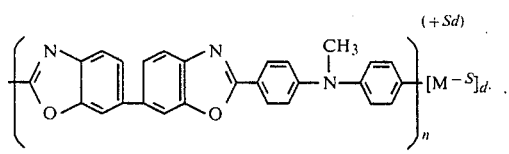

20. The electroactive polymer according to claim 15, wherein M can be either an anion or a cation and the polymer is selected from the group consisting of:

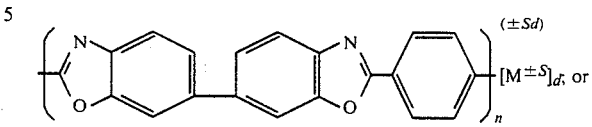

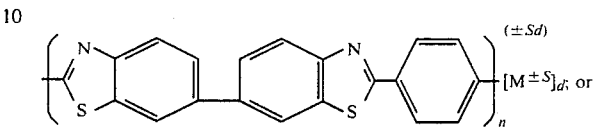

21. The electroactive polymer according to claim 17 wherein M is a cation and the polymer is selected from the group consisting of polybenzoxazole or polybenzothiazole.

22. The electroactive polymer according to claim 1 wherein the polymer has a molecular weight of from about 500 to 500,000.

23. The electroactive polymer according to claim 11 wherein n is greater than 50 but equal to or less than 1000.

24. The electroactive polymer according to claim 16 wherein n is greater than 50 but equal to or less than 1000.

25. The electroactive polymer according to claim 14 wherein a and c are 1 and b is 0 and the polymer has the formula:

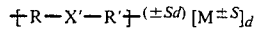

* * * * *

UNITED STATES PATENT AND TRADEMARK OFFICE
CERTIFICATE OF CORRECTION

PATENT NO. : 4,505,840

DATED : March 19, 1985

INVENTOR(S) : VICTOR P. KURKOV

It is certified that error appears in the above-identified patent and that said Letters Patent are hereby corrected as shown below:

Col. 8, Lines 48-53, " 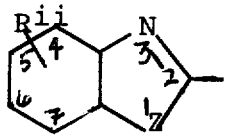 " should read

-- 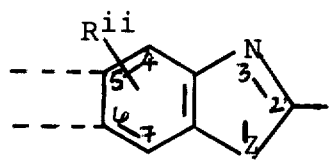 --.

Claim 12, Col. 31, Lines 60-65; " 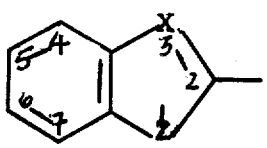 " should read

-- 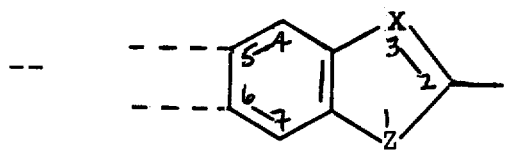 --.

UNITED STATES PATENT AND TRADEMARK OFFICE
CERTIFICATE OF CORRECTION

PATENT NO. : 4,505,840
DATED : March 19, 1985
INVENTOR(S) : VICTOR P. KURKOV

It is certified that error appears in the above-identified patent and that said Letters Patent are hereby corrected as shown below:

Claim 14, Col. 32, Lines 18-23 " 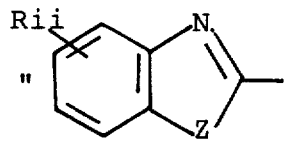 " should read

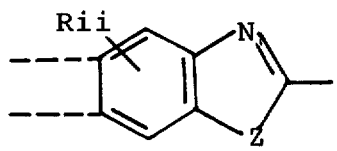

Claim 24, Line 2, "according to Claim 16" should read, --according to Claim 15.--

Signed and Sealed this

First Day of July 1986

[SEAL]

Attest:

DONALD J. QUIGG

Attesting Officer   Commissioner of Patents and Trademarks